Sept. 15, 1959     O. M. QUASTAD     2,904,348
TRACTOR HITCH
Filed Jan. 17, 1958     2 Sheets-Sheet 1
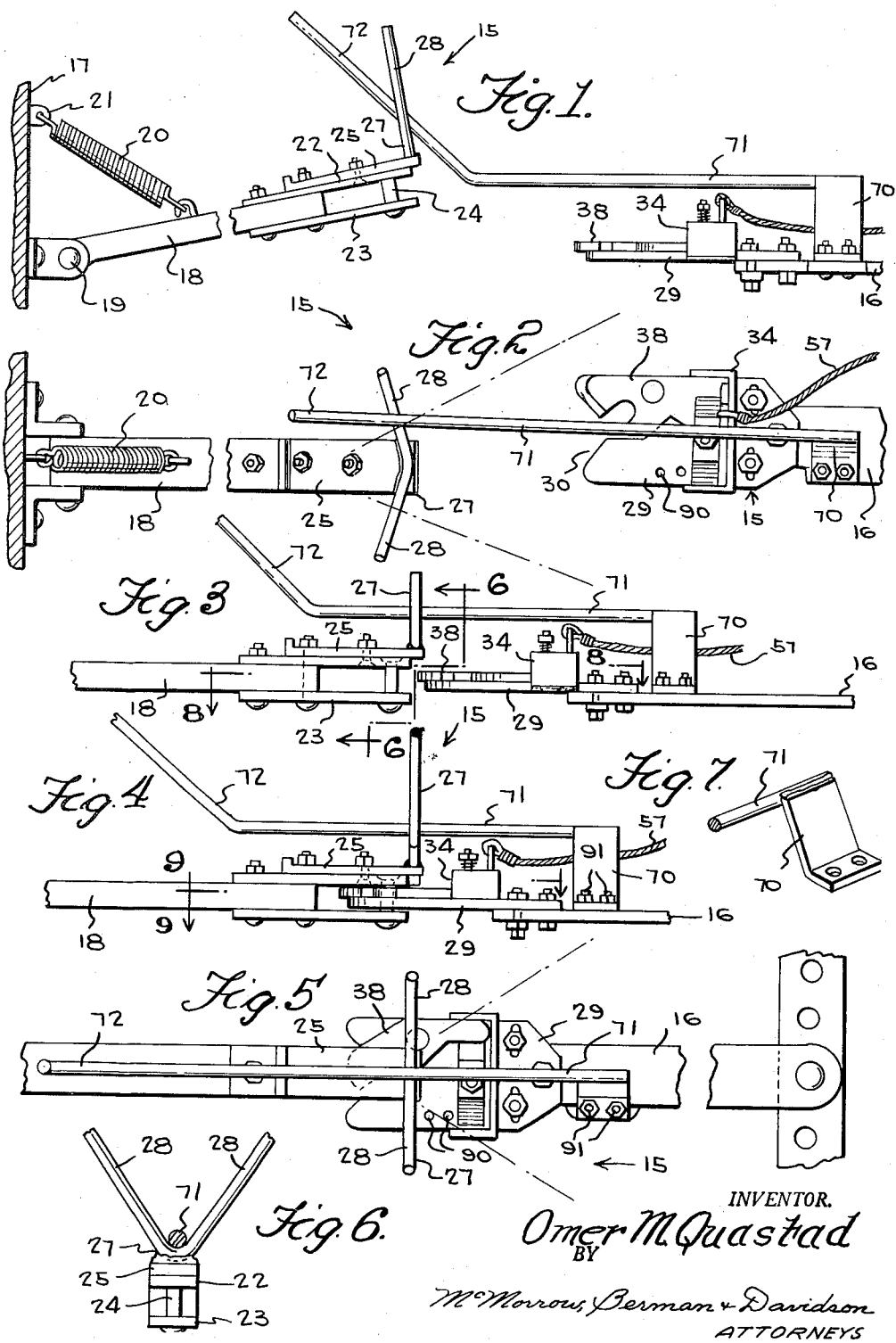
INVENTOR.
Omer M. Quastad
BY
McMorrow, Berman & Davidson
ATTORNEYS Sept. 15, 1959     O. M. QUASTAD     2,904,348
TRACTOR HITCH
Filed Jan. 17, 1958                                                2 Sheets-Sheet 2
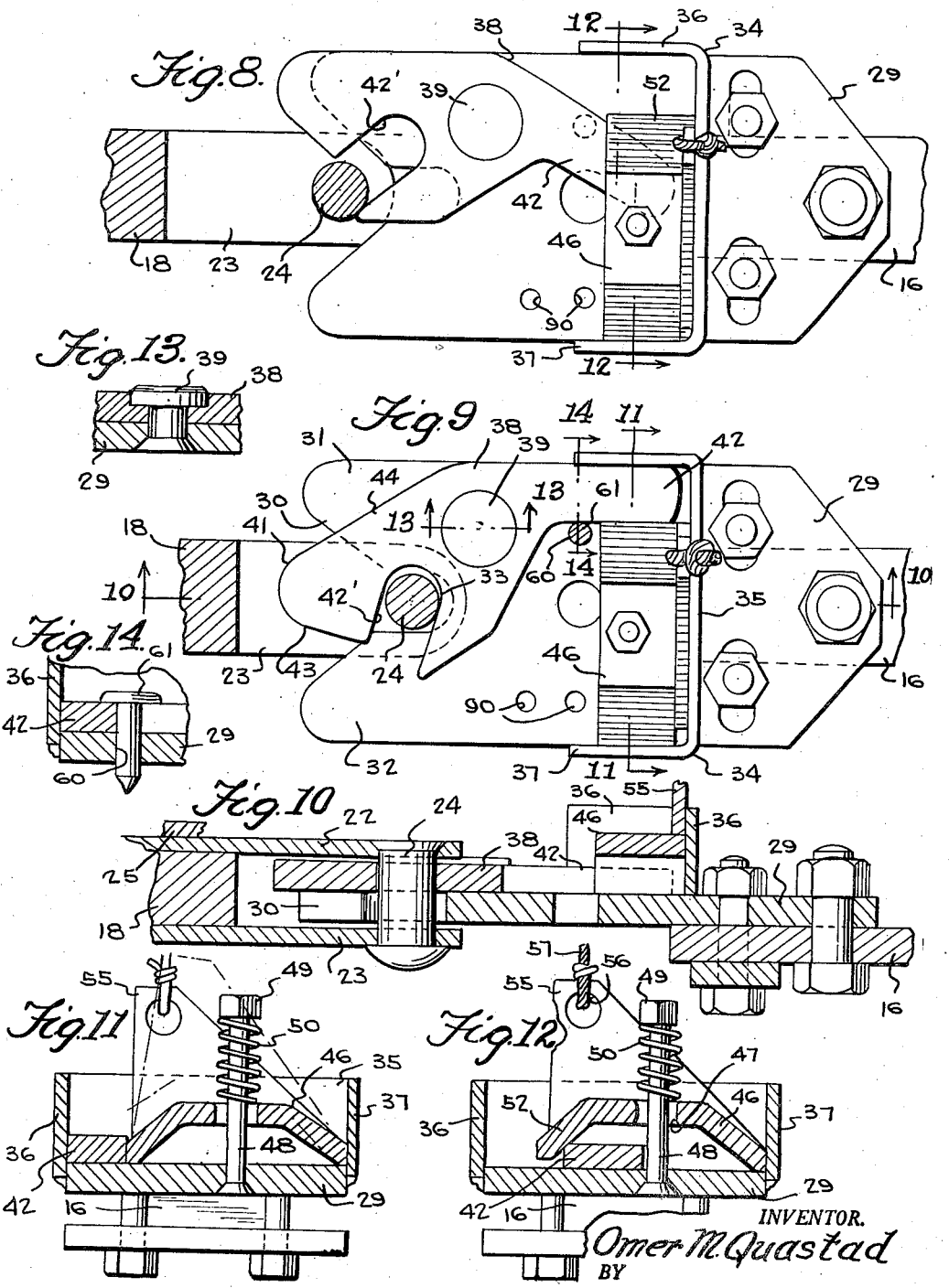
INVENTOR.
Omer M. Quastad
BY
McMorrow, Berman & Davidson
ATTORNEYS United States Patent Office 2,904,348
Patented Sept. 15, 1959

2,904,348

TRACTOR HITCH

Omer M. Quastad, Estherville, Iowa

Application January 17, 1958, Serial No. 709,641

3 Claims. (Cl. 280—477)

This invention relates to vehicle couplings, and more particularly to an improved coupling assembly for connecting a tractor to an implement to be drawn thereby, or to any other device to be hauled by the tractor.

The main object of the invention is to provide a novel and improved coupling assembly for connecting an implement or other object to a tractor, said assembly involving simple components, being easy to install, and allowing an implement or other object to be easily coupled to or uncoupled from a tractor without the necessity of the operator leaving the tractor seat.

A further object of the invention is to provide an improved coupling assembly for use on a tractor, said assembly being inexpensive to fabricate, involving relatively few parts, being rugged in construction, and providing a safe and reliable connection between the tractor and the implement or other object being hauled by the tractor.

Further objects and advantages of the invention will become apparent from the following description and claims, and from the accompanying drawings, wherein:

Figure 1 is a side elevational view of an improved tractor hitch coupling assembly according to the present invention, with the parts shown disengaged immediately prior to coupling.

Figure 2 is a top plan view of the structure shown in Figure 1.

Figure 3 is a side elevational view, similar to Figure 1, but showing the components of the assembly disposed in horizontal alignment immediately prior to actual coupling interengagement of the elements.

Figure 4 is a side elevational view, similar to Figure 3, but showing the elements in fully coupled positions.

Figure 5 is a top plan view of the structure shown in Figure 4.

Figure 6 is a transverse vertical cross sectional view taken on the line 6—6 of Figure 3.

Figure 7 is a fragmentary elevational view showing the supporting bracket for the longitudinally extending guide rod provided on the tractor-mounted coupling segment of the assembly.

Figure 8 is an enlarged horizontal cross sectional view taken substantially on the line 8—8 of Figure 3.

Figure 9 is an enlarged horizontal cross sectional view taken substantially on line 9—9 of Figure 4.

Figure 10 is a vertical cross sectional view taken on the line 10—10 of Figure 9.

Figure 11 is a transverse vertical cross sectional view taken on the line 11—11 of Figure 9.

Figure 12 is a transverse vertical cross sectional view taken on the line 12—12 of Figure 8.

Figure 13 is a vertical cross sectional detail view taken on the line 13—13 of Figure 9.

Figure 14 is a vertical cross sectional detail view taken on the line 14—14 of Figure 9.

Referring to the drawings, the coupling hitch assembly is designated generally at 15. Designated at 16 is the rearwardly extending drawbar of a tractor, and designated at 17 is an implement to be coupled to the tractor, said implement having a hitch tongue 18 pivoted to its forward end portion at 19, as shown in Figure 1, whereby the tongue 18 is rotatable around a transverse horizontal axis. A coiled spring 20 connects the intermediate portion of the tongue 18 to a fastening loop 21 provided on the implement 17 above the pivotal connection 19, whereby the hitch tongue 18 is normally supported in a somewhat elevated position, as shown in Figure 1.

Secured to the forward edge of hitch tongue 18 are the parallel, vertically spaced, respective top and bottom plate members 22 and 23 which extend forwardly from the tongue and which are provided at their forward ends with the vertical hitch pin 24 secured between the top and bottom plates 22 and 23 at their forward portions, as is clearly shown in Figure 1.

Secured on the top plate 22 is an auxiliary forwardly extending plate 25 which projects forwardly of the end edges of the plate members 24 and 23. Rigidly secured on the forwardly projecting portion of the auxiliary plate member 25 is a transversely extending, generally V-shaped rod member 27 having the upwardly and outwardly inclined arms 28, 28 of substantial length.

Secured on the rear end portion of the drawbar 16 is a horizontal plate member 29 of substantial width, said plate member being formed at its end portion with a V-notch 30 defining a pair of finger elements 31 and 32 and a relatively deep parallel-sided intermediate notch 33 slightly larger in width than the diameter of the hitch pin 24.

Rigidly secured to the rear portion of the horizontally extending main body member 29 is a generally U-shaped, upstanding flange member 34 having the transversely extending vertical bight portion 35 and the longitudinally extending vertical arm portions 36 and 37, said member 34 defining a rearwardly facing enclosure. Designated at 38 is a latch plate which is pivotally connected at its intermediate portion to the main body member 29, as by a rivet 39, the pivotal connection being located adjacent one side of the body member 29, namely, adjacent the finger element 31, as shown in Figures 8 and 9. The latch plate 38 is formed with the outer end arm 41 and the inner end arm 42, said inner end arm being received in the enclosure defined by the upstanding U-shaped flange member 34. The inner end arm 42 is rotatable in said enclosure and outward rotation thereof is limited by the engagement thereof with the vertical side arm 36 of member 34, as shown in Figure 9.

The outer end arm 41 of the latch plate 38 is formed with a parallel-sided, laterally directed, open-ended notch 42' which may be at times registered with the parallel-sided notch portion 33, as shown in Figure 9, the width of the notch 42' being slightly greater than the diameter of the hitch pin 24, so that the hitch pin may be at times received therein, as shown in Figure 9. The end of the arm 41 is rounded off and the arm is formed with the convergent side edge portions 43 and 44, the edge portion 43 being cammingly engageable with the hitch pin 24, as will be presently described.

Designated at 46 is a transversely extending, rigid, arched locking lever which is formed with a central aperture 47 receiving a vertical, upstanding stud member 48 rigidly secured to the main body 29, the upper end of the stud 48 extending above the arched locking lever 46 and being provided with a stop nut 49. The coiled spring 50 surrounds the portion of stud 48 between stop nut 49 and locking lever 46, biasing the locking lever downwardly.

As shown in Figure 12, one end portion of locking lever 46 pivotally engages in the corner defined between the upstanding side arm 37 of the U-shaped flange member 34 and the main body member 29. The inner arm portion 42 of the latch plate 38 is receivable beneath the opposite portion of the locking lever, as shown in Figure 12, normally engaging beneath the downwardly and outwardly inclined end portion 52 of the locking lever 46, as shown in Figure 12. Thus, the latch plate 38 may be held in the position thereof shown in Figure 8, namely, in its uncoupled position, by the retaining action of coiled spring 50, providing holding force on the arched locking lever 46. As will be seen from Figure 8, when the coupling pin 24 engages in the notch 42' and the tractor is moved rearwardly to cause the latch plate 38 to engage with the coupling pin 24, the pin exerts a camming force on the coupling plate 38, tending to rotate the coupling plate counterclockwise, as viewed in Figure 8, whereby the inner end arm 42 of the latch plate slips outwardly from beneath the retaining arm 52 of the locking lever 46, finally passing beneath said retaining arm 52 and engaging the upstanding side arm 36 of the U-shaped flange member 34, thus reaching the position shown in Figures 9 and 11. The spring 50 causes the holding element 52 of the locking lever 46 to slip downwardly against the side edge of the arm 42, thus preventing any further movement of the latch plate until the locking lever 46 is subsequently elevated.

The arched locking lever 46 is formed at one edge thereof with a vertically upwardly extending flange 55 provided with an aperture 56 at its top end. A cable 57 is fastened to the apertured top end portion of flange 55, said cable extending to a position on the tractor within convenient reach of the operator, whereby the operator may exert tension on cable 57 to elevate the locking lever 46 whenever he desires to release the latch plate 38, namely, whenever he desires to uncouple the tractor from an implement or other device to which it is hitched.

As will be readily apparent, even when the hitch is in a locked position, an implement may be coupled to the tractor without requiring the operator to leave his seat, since it is merely necessary for the operator to raise the locking lever 46 by means of cable 57 and then back the hitch against the coupling pin 24. The coupling pin forces the hitch open and then closes it as the coupling pin reaches its final position in the slots 33, 42'.

The body member 29 is provided adjacent the inside edge of arm 42 (with said arm in coupling position) with an aperture 60 in which an auxiliary locking pin 61 may be positioned, as shown in Figures 9 and 14, the pin 61 being provided with an enlarged head portion which overlies the arm 42, as shown in Figure 14, whereby the pin 61 may be at times easily removed from the aperture 60, namely, when it is desired to uncouple the tractor from the implement or other device attached thereto.

Rigidly secured to the drawbar 16 is an upwardly and inwardly inclined bracket plate 70, and rigidly secured to said bracket plate is a longitudinally extending guide rod 71 formed at its free end portion with the upwardly and rearwardly inclined arm 72 which is cammingly engageable within the V-shaped rod member 27 of the tongue 18 when it is desired to lower the tongue 18 to a position in horizontal alignment with said drawbar 16, namely, to a position wherein the locking pin 24 will enter the V-notch 30 of main body member 29 when the tractor is moved rearwardly relative to the drawbar 18. Thus, as shown in Figure 1, in preliminary coupling position, the inclined arm portion 72 of the guide rod 71 is engaged in the V-shaped rod 27, whereby rearward movement of the tractor causes the arm 72 to exert a camming action on the arms 28, 28 of the rod 27 to align the tongue 18 with the drawbar 16, and at the same time to lower the tongue 18 to a substantially horizontal position, such as that shown in Figure 3. The horizontal portion of the guide rod 71 then enters the V-shaped rod member 27 as the tractor continues its rearward movement, achieving the substantial alignment of the tongue 18 with the drawbar 16, as shown in Figures 3 and 4. Finally, with continued rearward movement of the tractor, the hitch pin 24 enters the notch 42 of latch plate 38, as above described, and cams the latch plate from the position of Figure 8 to the position of Figure 9, whereupon the arm 42 of the latch plate slips outwardly past the edge of the inclined end arm 52 of locking lever 46, locking the latch plate 38 in its coupling position, shown in Figures 9 and 11.

In order to release the latch plate, the release cable 57 must be pulled, whereby the locking lever 46 is elevated to the dotted view position thereof shown in Figure 11, allowing the latch plate 52 to be rotated in a clockwise direction, as viewed in Figure 9, responsive to the forward movement of the tractor relative to the implement or other device previously coupled thereto, whereby the locking pin 24 is withdrawn from the notches 42' and 23.

If so desired, the bracket plate 70 may be mounted on the base plate 29 instead of the drawbar, said base plate being provided with a pair of mounting holes 90, 90, located to receive the fastening bolts 91 employed to secured the bracket plate 70.

While a specific embodiment of a tractor hitch coupling has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A hitch coupling comprising a horizontal body member formed at one end with a notch defining a pair of horizontally spaced finger elements adapted to receive a vertical hitch pin therebetween, a horizontal latch plate pivoted on a vertical axis at its intermediate portion to said body member and formed with a notch at one end registrable with said first-named notch and engageable with the hitch pin when it is positioned between the finger elements, a locking lever pivotally mounted on said body member for rotation in a vertical plane transverse to said body member and yieldably secured to said body member and overlying the other end of the latch plate, an abutment element rising from said body member and spaced outwardly in said transverse plane from said locking lever to lockingly receive said other end of the latch plate between said abutment element and said locking lever when the notch of the latch plate is substantially in registry with the first-named notch, a hitch tongue, a V-shaped transverse upstanding rod member secured to said hitch tongue, a vertical hitch pin on said hitch tongue below said rod member receivable in said first-named notch, and a longitudinally extending guide rod secured to said body member cammingly engageable in said V-shaped rod member.

2. A hitch coupling comprising a horizontal body member formed at one end with a notch defining a pair of horizontally spaced finger elements adapted to receive a vertical hitch pin therebetween, a horizontal latch plate pivoted on a vertical axis at its intermediate portion to said body member and formed with a notch at one end registrable with said first-named notch and engageable with the hitch pin when it is positioned between the finger elements, an arched locking lever pivotally mounted on said body member for rotation in a vertical plane transverse to said body member and yieldably secured at its mid portion to said body member and overlying the other end of the latch plate, an abutment element rising from said body member and spaced horizontally outwardly in said transverse plane from said locking lever to lockingly receive said other end of the latch plate between said abutment element and an end of said locking lever when the notch of the latch plate is substantially in registry with the first-named notch, a hitch tongue, a V-shaped transverse upstanding rod member secured to said hitch tongue, a vertical hitch pin on said hitch tongue below said rod member receivable in said first-named notch, and a longitudinally extending guide rod secured to said body member cammingly engageable in said V-shaped rod member.

3. A hitch coupling comprising a body member having a planiform surface and a notch at one end of said surface, a latch plate pivoted between its ends on said member to swing in face-to-face contact with said surface between latching and unlatching positions, the plate having an inner end arm and having an outer end arm formed with a notch registering with the first notch in said latching position of the plate, a locking lever pivoting on the body member about an axis normal to that of the latch plate, a headed stud member projecting from said surface, means on the body member resiliently yieldably biasing the locking lever into contact with said surface, comprising a compression coil spring circumposed about the stud member and abutting at its ends against the head of the stud member and the locking lever respectively, said locking lever when contacting said surface being engaged with one side of the inner end arm in said latching position of the latch plate to prevent swinging of the latch plate in one direction from its latching position, an abutment on the body member projecting from said surface in position to engage the other side of the inner end arm in said latching position of the latch plate to prevent the latch plate from swinging in an opposite direction from its latching position, the stud member being positioned to limit the inner end arm against swinging movement in said one direction beyond the unlatching position of the latch plate, the locking lever having an aperture loosely receiving the stud member, means remotely operable by a user and connected to the locking lever for rocking the same away from said surface against the restraint of the spring to release the latch plate for swinging movement in said one direction toward its unlatching position, a hitch tongue, and a hitch pin on the tongue confined, in the latching position of the latch plate, within said notches crosswise of the plane of said surface.

References Cited in the file of this patent

UNITED STATES PATENTS

| 644,338 | Slauson | Feb. 27, 1900 |
| 1,060,441 | Engel | Apr. 29, 1913 |
| 2,822,739 | Altgelt | Feb. 11, 1958 |

FOREIGN PATENTS

| 929,651 | Germany | June 30, 1955 |